(12) United States Patent
Zaneveld

(10) Patent No.: US 10,350,833 B1
(45) Date of Patent: Jul. 16, 2019

(54) METHODS AND SYSTEMS FOR CREATING ANATOMICAL MODELS

(71) Applicant: Jacques Zaneveld, Houston, TX (US)

(72) Inventor: Jacques Zaneveld, Houston, TX (US)

( * ) Notice: Subject to any disclaimer, the term of this patent is extended or adjusted under 35 U.S.C. 154(b) by 0 days.

(21) Appl. No.: 15/152,948

(22) Filed: May 12, 2016

Related U.S. Application Data

(60) Provisional application No. 62/160,386, filed on May 12, 2015.

(51) Int. Cl.
| | |
|---|---|
| *B33Y 10/00* | (2015.01) |
| *B33Y 80/00* | (2015.01) |
| *G09B 23/30* | (2006.01) |
| *B29C 67/00* | (2017.01) |
| *B29C 64/386* | (2017.01) |
| *B29K 29/00* | (2006.01) |
| *B29K 83/00* | (2006.01) |
| *B29L 31/40* | (2006.01) |

(52) U.S. Cl.
CPC ........ *B29C 67/0088* (2013.01); *B29C 64/386* (2017.08); *G09B 23/30* (2013.01); *B29K 2029/04* (2013.01); *B29K 2083/005* (2013.01); *B29L 2031/40* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 4,277,367 A | 7/1981 | Madsen et al. | |
| 5,805,665 A | 9/1998 | Nelson | |
| 5,902,748 A | 5/1999 | Madson | |
| 6,675,035 B1 | 1/2004 | Grable et al. | |
| 6,945,783 B2 | 9/2005 | Weissman et al. | |
| 9,183,764 B2 | 11/2015 | Sugimoto et al. | |
| 2005/0202381 A1* | 9/2005 | Keegan | G09B 23/286 434/262 |
| 2008/0076099 A1 | 3/2008 | Sarvazyan | |
| 2011/0207103 A1* | 8/2011 | Trotta | B29C 39/006 434/267 |

(Continued)

FOREIGN PATENT DOCUMENTS

| | | |
|---|---|---|
| JP | 2012002211 | 1/2012 |
| WO | WO2012132463 | 7/2014 |

OTHER PUBLICATIONS

Amy L. Orsborn, Update: the turquoise brain project, Jun. 30, 2015.

(Continued)

*Primary Examiner* — Jacob T Minskey
*Assistant Examiner* — Baileigh Kate Darnell
(74) *Attorney, Agent, or Firm* — Elliott & Polasek, PLLC; Douglas H. Elliott; Nathan Q. Huynh

(57) ABSTRACT

One or more specific embodiments herein includes a method for producing an anatomical model, comprising providing a mold having a first cavity shaped to correspond to an anatomical structure, providing an insert inside the first cavity of the mold, positioning a first material into the first cavity such that the first material forms a base model, removing at least one portion of the insert from the mold to form a second cavity inside the mold, and positioning a second material into at least a portion of the second cavity.

19 Claims, 8 Drawing Sheets

(56) References Cited

U.S. PATENT DOCUMENTS

| | | | | |
|---|---|---|---|---|
| 2011/0207104 | A1* | 8/2011 | Trotta | B29C 39/006 |
| | | | | 434/267 |
| 2012/0292811 | A1* | 11/2012 | Takeda | B29C 33/448 |
| | | | | 264/219 |
| 2013/0040110 | A1* | 2/2013 | Matsui | B29C 67/0081 |
| | | | | 428/156 |
| 2013/0192741 | A1 | 8/2013 | Trotta et al. | |
| 2014/0011172 | A1* | 1/2014 | Lowe | G09B 23/30 |
| | | | | 434/273 |
| 2014/0017651 | A1 | 1/2014 | Sugimoto et al. | |
| 2014/0162016 | A1* | 6/2014 | Matsui | B29C 69/00 |
| | | | | 428/76 |
| 2015/0029184 | A1* | 1/2015 | Masumoto | G06T 19/00 |
| | | | | 345/419 |
| 2016/0287339 | A1* | 10/2016 | Bin Abdul Rahman | |
| | | | | G09B 23/286 |

OTHER PUBLICATIONS

Margaret Knoedler, et al., Individualized Physical 3-dimensional Kidney Tumor Models Constructed from 3-dimensional Printers Result in Improved Trainee Anatomic Understanding, Journal of Urology, Jun. 2015, pp. 1257-1262, vol. 85, Issue 6.

Bryan E. Yunker, et al., The Design and Fabrication of Two Portal Vein Flow Phantoms by Different Methods, The International Journal of Medical Physics Research and Practice, Jan. 16, 2014, pp. 023701-1 through 023701-6, vol. 41, Issue 2.

Jonathan L. Silberstein, et al., Physical Models of Renal Malignancies Using Standard Cross-sectional Imaging and 3-Dimensional Printers: A Pilot Study, Journal of Urology, Aug. 2014, pp. 268-273, vol. 84, Issue 2.

R.S. Crockett, et al., Accurate Heart Model for Pacemaker Development via SFF, Solid Freeform Fabrication Proceedings, 2004, pp. 765-772.

* cited by examiner

METHODS AND SYSTEMS FOR CREATING ANATOMICAL MODELS

BACKGROUND

1. Field of Inventions

The field of this application and any resulting patent is creation of anatomical models.

2. Description of Related Art

Various methods and systems have been proposed and utilized to create anatomical models including the methods and systems disclosed in the references appearing on the face of this patent. However, these methods and systems lack all the steps or features of the methods and devices covered by the patent claims below. Furthermore, the methods and systems covered by at least some of the claims of this issued patent may solve many of the problems that prior art methods and systems have failed to solve. Also, the methods and systems covered by at least some of the claims of this patent may have benefits that would be surprising and unexpected to a person of ordinary skill in the art based on the prior art existing at the time of the inventions set forth in one or more of the claims herein.

SUMMARY

One or more specific embodiments herein includes a method for producing an anatomical model, comprising providing a mold having a first cavity shaped to correspond to an anatomical structure, providing an insert inside the first cavity of the mold, positioning a first material into the first cavity such that the first material forms a base model, removing at least one portion of the insert from the mold to form a second cavity inside the mold, and positioning a second material into at least a portion of the second cavity.

One or more specific embodiments herein includes a method for producing an anatomical model, comprising providing a mold having a first cavity shaped to correspond to an anatomical structure, wherein the mold comprises at least one elongated channel, providing an insert inside the first cavity of the mold, wherein the insert comprises an elongated structure that corresponds at least partially to the elongated channel, positioning a first material into the first cavity to form a base model, removing at least one portion of the insert from the mold to form a second cavity inside the mold, and positioning a second material into at least a portion of the second cavity. The mold, the insert, or both the mold and the insert are produced by layering.

One or more specific embodiments herein includes a method for producing an anatomical model, comprising providing a mold having a first cavity shaped to correspond to an anatomical structure, providing an insert inside the first cavity of the mold, positioning a first material into the first cavity to form a base model, liquefying at least one portion of the insert to form a liquid portion, removing the liquid portion to form a second cavity inside the mold, and positioning a second material into at least a portion of the second cavity.

DETAILED DESCRIPTION

1. Introduction

Figure 1:
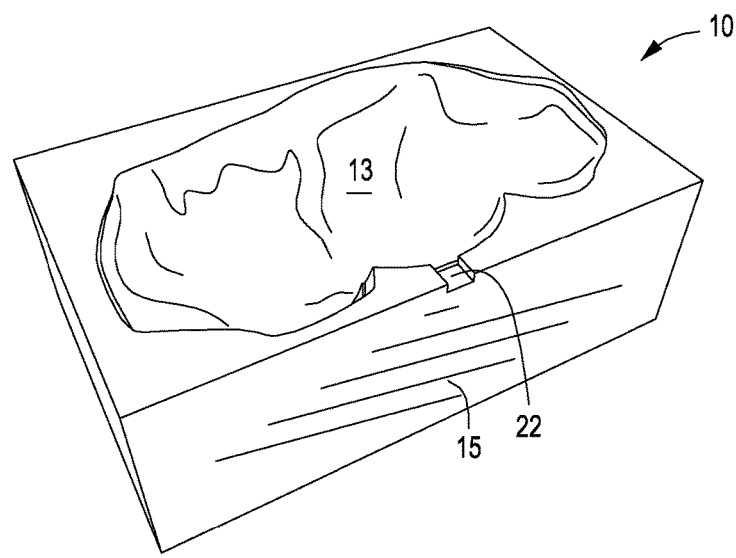
FIG. 1 is a perspective view of one mold piece according to one embodiment of the present disclosure.

A detailed description will now be provided. The purpose of this detailed description, which includes the drawings, is to satisfy the statutory requirements of 35 U.S.C. § 112. For example, the detailed description includes a description of the inventions and sufficient information that would enable a person having ordinary skill in the art to make and use the inventions defined by the claims. The figures are intended to assist in the description and to provide visual representations of certain aspects of the subject matter described herein. The figures do not limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in printed publications, dictionaries, and issued patents.

2. Selected Definitions

Certain claims include one or more of the following terms which, as used herein, are expressly defined below.

The term "removable" as used herein is defined as capable of being removed from a particular spatial location, e.g., from a cavity or from contact with another object. A removable object, e.g., a removable insert, is preferably capable of being separated from another object without irreversibly compromising the shape or characteristics of that other object. For example, a removable object entangled in a non-removable object may be formed of a material that is capable of dissolving in a particular solvent, after which the dissolved material may be removed from the other object with which it was previously entangled. In contrast, the non-removable object can be a material that is not capable of dissolving in that particular solvent. For example, a removable object entangled in a non-removable object may comprise a material that has a first melting point, while the non-removable object comprises a material that has a melting point that is higher than the first melting point.

The term "insert" as used herein is defined as any physical object, preferably one that is artificial and has the shape of a feature that is being modeled, such as a tumor. An insert is preferably an object that is capable of being positioned at least partially inside or within a cavity or another object, e.g., the model of an organ. An insert may also be inside a cavity or other object, i.e., after it has been placed therein. An insert may be partially or wholly removable. An insert may comprise one or more portions. An insert may comprise a first portion, a second portion, a third portion, and so forth. An insert comprising a first portion and a second portion may exist as two separate and distinct objects that are not coupled to one another. An insert comprising a first portion and a second portion may be such that the first portion is removable and the second portion is not removable. An insert comprising a first portion and a second portion may be such that both portions are removable (e.g., capable of being liquefied), and the first portion and the second portions are capable of being removed separately or simultaneously. An insert may comprise an elongated structure capable of engaging with a corresponding elongated channel in a mold. An insert may be capable of being produced by layering. An insert may be capable of being positioned within a cavity such that the insert is fixed in location with respect to the cavity. An insert may be capable of being liquefied.

The term "material" as used herein is defined as any liquid, solid, or semi-solid substance, composition, or mixture. A material may comprise a mixture of two or more materials. A first material may be identical to a second material and/or a third material. Alternatively, a first material may be different from a second or a third material. A first material may comprise different volumes or concentrations of various compounds or structures as those found in a second material or a third material. For example, a first material may comprise 80% silicone, while a second material may comprise 90% silicone. A material may comprise, for example, a combination containing some or all of the following: resins, plastics, polymers, rubber, oils, and dyes. For example, a material may comprise platinum-cured silicone rubber such as Dragon Skin® 10 A Fast. A material may comprise a silicone thinner. A material may have a shore hardness between 0 A, 5 A, 10 A, or 15 A to 10 A, 15 A, 20 A, 25 A, or 30 A as measured by ASTM test D-2240. A material may have a tensile strength at 100% elongation ranging from a low of 100, 150, 200, 250, 300, or 400 psi to 250, 300, 350, 400, 500, or 600 psi as measured by ASTM test D-412. The material may have a tensile stress at 100% elongation ranging from a low of 5, 10, 15, 25, 40, 50, or 60 psi to a high of 40, 50, 60, 75, 80, 90, or 100 psi as measured by ASTM test D-412.

The term "data set" as used herein is defined as computer-readable information. A data set may comprise three-dimensional data. A data set may be derived from a patient's MRI data, CT data, and/or 3D ultrasound data. A data set may be derived from information collected and assembled in electronic form.

The term "structure" as used herein is defined as any physical object. An anatomical structure may be a physical object having the same shape as some part of the anatomy of a living being, such as an organ, implant, or other natural or artificial body part of an organism, human or otherwise. A pathological structure may be any physical object related to a disease of the body. Exemplary pathological structures include tumors, growths, embolisms, inflamed tissues, diseased organs, and arterial deformities or blockages. An elongated structure may be a structure having at least one side longer than another side, as exemplified in the drawings herein. For example, an elongated structure may comprise a hollow or non-hollow cylinder, a hollow or non-hollow prism, a tubular structure, or a protrusion. An elongated structure may have one or more curved sides.

The term "cavity" as used herein is defined as any hollow space within an object or on an object's surface. A cavity may have various objects or material positioned within its space. For example, a cavity may have an uncured resin or polymer positioned within it. A cavity may have more than one object within its space. For example, an insert may be inside a cavity and simultaneously a material may also be inside the cavity. A cavity may be formed when an object is removed from another object. A cavity may be shaped to correspond to a first object when the first object is removed from a second object. A cavity may be specifically design to correspond to an anatomical structure.

The term "model" as used herein is defined as a representation, preferably of a specific object or structure. A model may refer to a physical model which is capable of being touched and which might be a representation of a particular human organ, for example. A model may refer to a computer model that is a visual representation of mathematical data, e.g., a three dimensional computer rendering. An anatomical model may be a representation of an anatomical structure. A model may be a computer model of a mold and might be referred to herein as a "mold model." A base model may comprise a model to which other structures, parts, or models may be added. A base model may comprise a model to undergo further processes prior to its completion without adding other structures. For example, a base model comprising a removable insert may be processed to remove the insert. A model (physical and/or computer) may be derived from three-dimensional imaging data, e.g., MRI data. A model (physical and/or computer) may be derived from two-dimensional imaging data, e.g., MRI slice data. A physical model may be formed from a mold.

The term "mold" as used herein is defined as a structure having a cavity, and in certain embodiments, the mold may be an anatomical representation.

The term "liquefy" as used herein is defined as to either become partially or fully a liquid or to cause something to become partially or fully a liquid. For example, heating certain types of material may cause those materials to melt and thus liquefy or become liquefied, in which case the act of heating the material is also liquefying the material. For example, certain materials may be soluble in certain solvents and thus liquefy, in which case the act of dissolving the material is also liquefying the material.

The term "remove" as used herein is defined as move from, and examples of removing things in this application include removing inserts by melting or dissolving the insert, followed by moving the liquefied insert, that is, a melted or dissolved insert material, away from a location inside the cavity to a location outside the cavity. Another example of removing something includes physical dislocation, such as an insert that can be manually separated from a base model by the application of physical force.

The term "corresponds to" as used herein is defined as related to or associated with, e.g., be similar, analogous, or equivalent to. For example, a mold may correspond to an anatomical structure if the cavity in the mold is shaped to resemble the anatomical structure. For example, an insert may correspond to a feature of an anatomical structure, e.g., a tumor or vasculature, if the insert is partially shaped or formed to resemble the tumor. For example, an elongated structure may correspond to an elongated channel when the elongated structure fits into the elongated channel and is prevented from rotating. Two puzzle pieces may be considered to correspond to one another. For example, an anatomical structure, e.g., a kidney having a tumor positioned inside a human body, may correspond to imaging data, e.g., from an MRI or CAT scan, if the imaging data was produced by scanning the anatomical structure.

The term "feature" as used herein is defined as a part or characteristic of some other part of a model and/or anatomy. A pathological feature is a feature that is pathological in nature, e.g., is cause by or involves disease. For example, a tumor may be a feature of a kidney.

The term "modify" as used herein is defined as to change somewhat or drastically the form or qualities of something.

The term "channel" as used herein is defined as a groove or other indentation on a surface of an object. Different channels may have different shapes and geometries. For example, one of the channels in the drawings has a rectangular cross-section, while another has a rounded or elliptical cross-section. Other channels may have yet different cross sections or have cross-sections that are different in shape or size even for a single channel.

The term "derived from" as used herein is defined as the state of one thing that originates from another thing, or that owes its existence to something else.

The term "layering" as used herein is defined as any process that involves placing or removing at least one layer of material on or from a surface, which may be another layer, and may also include successive layering, which is placing or removing one layer on or from another layer, and then placing or removing another layer on or from the layer that was most recently placed or removed, etc. Two examples of processes that involve successive layering are three-dimensional printing and laser cutting.

3. Certain Specific Embodiments

Now, certain specific embodiments are described, which are by no means an exclusive description of the inventions. Other specific embodiments, including those referenced in the drawing, are encompassed by this application, and any patent that issues therefrom.

One or more specific embodiments herein includes a method for producing an anatomical model, comprising providing a mold having a first cavity shaped to correspond to an anatomical structure, providing an insert inside the first cavity of the mold, positioning a first material into the first cavity such that the first material forms a base model, removing at least one portion of the insert from the mold to form a second cavity inside the mold, and positioning a second material into at least a portion of the second cavity.

One or more specific embodiments herein includes a method for producing an anatomical model, comprising providing a mold having a first cavity shaped to correspond to an anatomical structure, wherein the mold comprises at least one elongated channel, providing an insert inside the first cavity of the mold, wherein the insert comprises an elongated structure that corresponds at least partially to the elongated channel, positioning a first material into the first cavity to form a base model, removing at least one portion of the insert from the mold to form a second cavity inside the mold, and positioning a second material into at least a portion of the second cavity. The mold, the insert, or both the mold and the insert are produced by layering.

One or more specific embodiments herein includes a method for producing an anatomical model, comprising providing a mold having a first cavity shaped to correspond to an anatomical structure, providing an insert inside the first cavity of the mold, positioning a first material into the first cavity to form a base model, liquefying at least one portion of the insert to form a liquid portion, removing the liquid portion to form a second cavity inside the mold, and positioning a second material into at least a portion of the second cavity.

One or more specific embodiments herein includes a method for producing an anatomical model comprising obtaining a computer model an anatomical structure for use with a computer-aided design program, modifying the computer model to produce a computer mold model, producing a mold from the computer mold model, the mold having a first cavity and an outer surface, producing an insert, positioning the insert in the first cavity of the mold, placing a first material into the first cavity of the mold and adjacent to the insert, permitting the first material to solidify within the mold, forming a base model, removing the insert from the mold, thereby forming a second cavity in the mold, placing a second material into the second cavity of the mold, and permitting the second material to solidify.

One or more specific embodiments herein includes a method for producing an anatomical model comprising obtaining a first data set that forms an anatomical model corresponding to an anatomical structure of an organism, deriving a second data set and a third data set from the first data set, wherein the second data set corresponds to a first feature of the anatomical structure and the third data set corresponds to a third feature of the anatomical structure, deriving a fifth data set using the first data set and a fourth data set that forms a solid model that forms a computer mold model with a first cavity corresponding to the anatomical model, modifying the third data set to include an elongated structure, thereby forming a sixth data set, modifying the fifth data set to include an elongated channel that corresponds at least partially to the elongated structure, thereby forming a seventh data set, producing an insert that corresponds to the sixth data set, producing a mold that corresponds to the seventh data set, positioning the insert inside the mold, placing a first material in the mold, permitting the first material to solidify, removing the insert from the mold, thereby forming a second cavity in the mold, placing a second material in the second cavity, and permitting the second material to solidify.

One or more specific embodiments herein includes a system for use in producing an anatomical model comprising a first insert that is shaped to correspond to an anatomical structure in a living organism, wherein the first insert comprises a first material, and a mold that is shaped to correspond to the anatomical structure. The anatomical structure comprises a pathological structure. The mold comprises a second material. At least 50% of the first material is capable of liquefying under conditions that do not liquefy 95% of the mold.

One or more specific embodiments herein includes a system for use in producing an anatomical model comprising, a first insert that is shaped to correspond to a first feature of an anatomical structure, a second insert that is shaped to correspond to a second feature of the anatomical structure, and a mold that is shaped to correspond to the anatomical structure. The first insert and the second insert are capable of being fixed in position relative to the mold, thereby forming an assembled mold. The assembled mold is capable of containing a base model formed from a first material. The first insert, the second insert, or both the first and second inserts are capable of being liquefied and then removed from the mold.

In any of the methods or systems disclosed herein, three-dimensional data sets may be captured using magnetic resonance imaging (MRI), computerized tomography (CT), ultrasound (US), nuclear medicine, or microscopy techniques.

In any one of the methods or systems disclosed herein, the mold insert may comprise polyvinyl alcohol (PVA), acrylonitrile butadiene styrene (ABS), and/or high-impact polystyrene (HIPS).

In any one of the methods or systems disclosed herein, the mold base and/or the mold insert may comprise polylactic acid (PLA), ABS, plastics, polymers, rubbers, resins, and/or metals.

In any of the methods or systems disclosed herein, three-dimensional data set of an anatomical structure may be modified to simplify complex portions of the model that are unnecessary for its intended purpose.

In any of the methods or systems disclosed herein, three-dimensional data of an organ may be modified to remove connecting structures from the organ that are unnecessary for its intended purpose.

In any of the methods or systems disclosed herein, the material may be pressure injected into the mold.

In any of the methods or systems disclosed herein, the material may be poured into the mold without additional external force.

In any of the methods or systems disclosed herein, a brace may be positioned such that the brace extends into the first material and the second material.

In any of the methods or systems disclosed herein, the first material may have at least one property that is different from the second material including, but not limited to, shore hardness, tensile strength, elasticity, rebound characteristics, density, dielectric properties (permittivity and conductivity), sonographic properties, magnetic properties or color.

In any of the methods or systems disclosed herein, the mold may be provided using additive manufacturing techniques, e.g., three-dimensional printing techniques.

In any of the methods or systems disclosed herein, the mold may be provided using subtractive manufacturing techniques.

In any of the methods or systems disclosed herein, the insert may comprise a first insert portion and a second insert portion.

In any of the methods or systems disclosed herein, removing at least a portion of the insert from the mold may comprise removing the first insert portion.

Any one of the methods or systems disclosed herein may further comprise removing another insert portion from the mold to form a third cavity inside the mold, and positioning a third material into at least a portion of the third cavity.

In any of the methods or systems disclosed herein, the insert may correspond to one or more features of the anatomical structure.

Any one of the methods or systems disclosed herein may further comprise positioning the first material into the second cavity such that the first material at least partially surrounds the second material.

In any of the methods or systems disclosed herein, positioning the first material into the first cavity such that the first material forms the base model may comprise placing the first material in liquid form into the first cavity and permitting the first material to solidify.

In any of the methods or systems disclosed herein, the anatomical structure may comprise a pathological structure.

In any of the methods or systems disclosed herein, removing at least a portion of the insert from the mold may comprise dissolving or melting the portion of the insert while the first material remains solidified.

In any of the methods or systems disclosed herein, providing a mold may comprise producing the mold using a three-dimensional printer from a computer mold model.

In any of the methods or systems disclosed herein, providing an insert inside the first cavity of the mold may comprise producing the insert using a three-dimensional printer and positioning the insert inside the first cavity of the mold.

In any of the methods or systems disclosed herein, the first material, the second material, or both the first and second materials may have a shore hardness from 0 to 30 on the shore A scale after solidifying.

In any of the methods or systems disclosed herein, the insert may comprise polyvinyl alcohol.

In any of the methods or systems disclosed herein, the mold may comprise a first section and a second section, and the first section and the second section are capable of being removably coupled to one another.

In any of the methods or systems disclosed herein, the elongated structure may be non-cylindrical.

In any of the methods or systems disclosed herein, the elongated structure may be a protrusion and the elongated channel is a groove.

In any of the methods or systems disclosed herein, the first material may comprise silicone rubber.

In any of the methods or systems disclosed herein, the anatomical structure may correspond to imaging data from an MRI or CAT scan.

In any of the methods or systems disclosed herein, the anatomical structure may comprise a first feature.

In any of the methods or systems disclosed herein, the second material may have at least one physical property that differs from that of the first material.

In any of the methods or systems disclosed herein, the computer model may be derived from patient MRI data or CAT scan data.

In any of the methods or systems disclosed herein, the computer model may be derived from a plurality of two dimensional images.

In any of the methods or systems disclosed herein, modifying the computer model may comprise subtracting at least a portion of the computer model from a solid object model to obtain the computer mold model.

In any of the methods or systems disclosed herein, modifying the computer model to produce the computer mold model may comprise adding a channel extending from an inner surface of the computer mold model to an outer surface of the computer mold model.

In any of the methods or systems disclosed herein, the first material may have a conductivity between 0 and 10 S/m at a frequency of 13.5 MHz and an electric susceptibility between 25 and 500 after solidifying.

Any one of the methods or systems disclosed herein may further comprise liquefying the mold.

In any of the methods or systems disclosed herein, liquefying the insert may comprise dissolving or melting the insert.

Any one of the methods or systems disclosed herein may further comprise a third insert that is capable of being fixed in position relative to the mold, wherein the third insert is capable of being liquefied.

In any of the methods or systems disclosed herein, the first feature or the second feature of an anatomical model may correspond to vasculature structures, bone structures, musculature structures, pathological structures, or any other structure found in an organism.

Some specific embodiments herein may include a mold or system produced using any of the processes described in this specification.

4. Specific Embodiments in the Figures

The drawings presented herein are for illustrative purposes only and are not intended to limit the scope of the claims. Rather, the drawings are intended to help enable one having ordinary skill in the art to make and use the claimed inventions. Various aspects of certain specific embodiments of methods for creating realistic anatomical models are depicted. These methods have steps any one of which may be found in various specific embodiments, including both those that are shown in this specification and those that are not shown.

Figure 2:
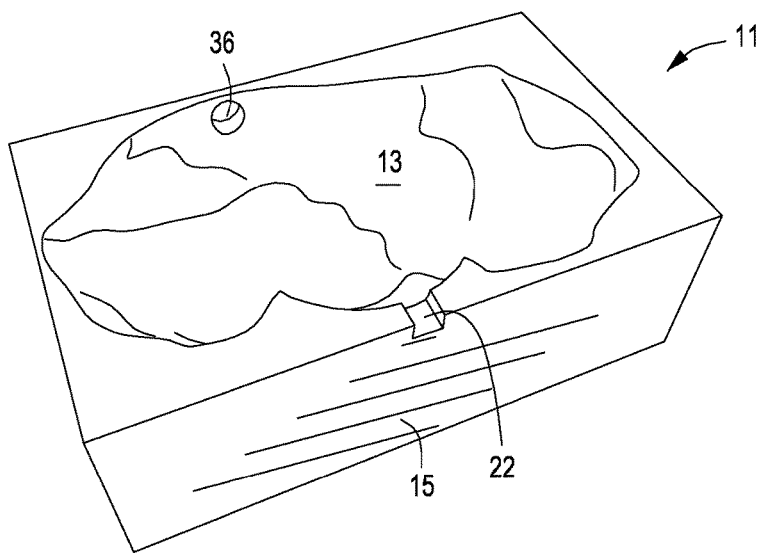
FIG. 2 is a perspective view of a second mold piece according to one embodiment of the present disclosure.
Figure 3:
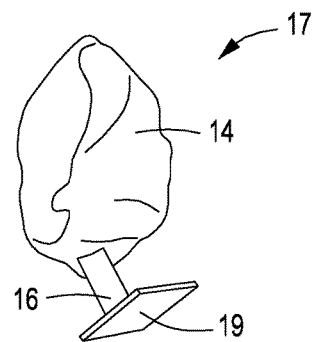
FIG. 3 is a perspective view of an insert according to one embodiment of the present disclosure.

Referring to FIGS. 1, 2, and 3, a bottom portion 10 and a top portion 11 of a mold and an insert 17 are depicted. Three-dimensional data sets, such as CT or MRI data, may be used to produce a computer model of an anatomical structure. The three-dimensional data set may be from a particular patient. Alternatively, a model may be created from scratch using Computer Aided Design (CAD) software. For example, an implant to be positioned within a patient may be sculpted and shaped from scratch using a CAD program to the patient's and/or physician's specifications. An object to be modeled may utilize portions that require modeling materials having different characteristics, e.g., tensile strengths. For example, in the structures shown in FIGS. 1-3, MRI data of a patient's kidney having a tumor was used to produce the mold and insert 17. The MRI data is preferably able to differentiate between different types of tissue, in this case, between the kidney and the tumor. MRI data may be processed in into a three-dimensional model using data interpretation software such as 3D Slicer™.

In FIGS. 1 and 2, the bottom portion 10 and top portion 11 may be combined to form a cavity 13 that has the shape, e.g., the negative shape, of a desired anatomical structure. The cavity walls may form the outer surface of the anatomical model that is to be produced. The bottom portion 10, the top portion 11, or both, may have one or more structures or channels 22 with which an insert 17 can be oriented. The channel 22 may be non-cylindrical in shape such that a corresponding shape positioned in the channel 22 is not capable of rotating, which facilitates the proper orienting of insert 17 within the cavity 13. An opening 36 may be positioned in either the top portion 11 (as pictured), the bottom portion 10, or both the top portion 11 and bottom portion 10, through which liquefied material may be poured into the cavity 13 of the mold (see FIG. 5). The cavity 13 is formed when the top portion 11 and bottom portion 10 of the mold are assembled, and the cavity 13 may correspond to the kidney plus the tumor.

In FIG. 3, the tumor shape 14 of the insert 17 may be shaped to correspond to a tumor structure in an organism. The insert 17 may include an elongated structure 16 (e.g., a rectangular prism) that is capable of being positioned in the channel 22 in the top portion 11 and/or bottom portion 10 of the mold. The insert base may include an extension 19 that serves to assist in positioning the insert 17 in the cavity 13 of the mold. For example, the insert 17 may be positioned such that the extension 19 is immediately adjacent to a side wall (15, FIGS. 1 and 2) of the top portion 11 and/or bottom portion 10 of the mold. The elongated structure 16 and the extension 19 on the tumor base each or both may cause the tumor shape 14 of the insert 17 to be positioned at a specific three-dimensional location with respect to the top portion 11 and the bottom portion 10 of the mold. The insert 17 preferably comprises PVA.

Figure 4:
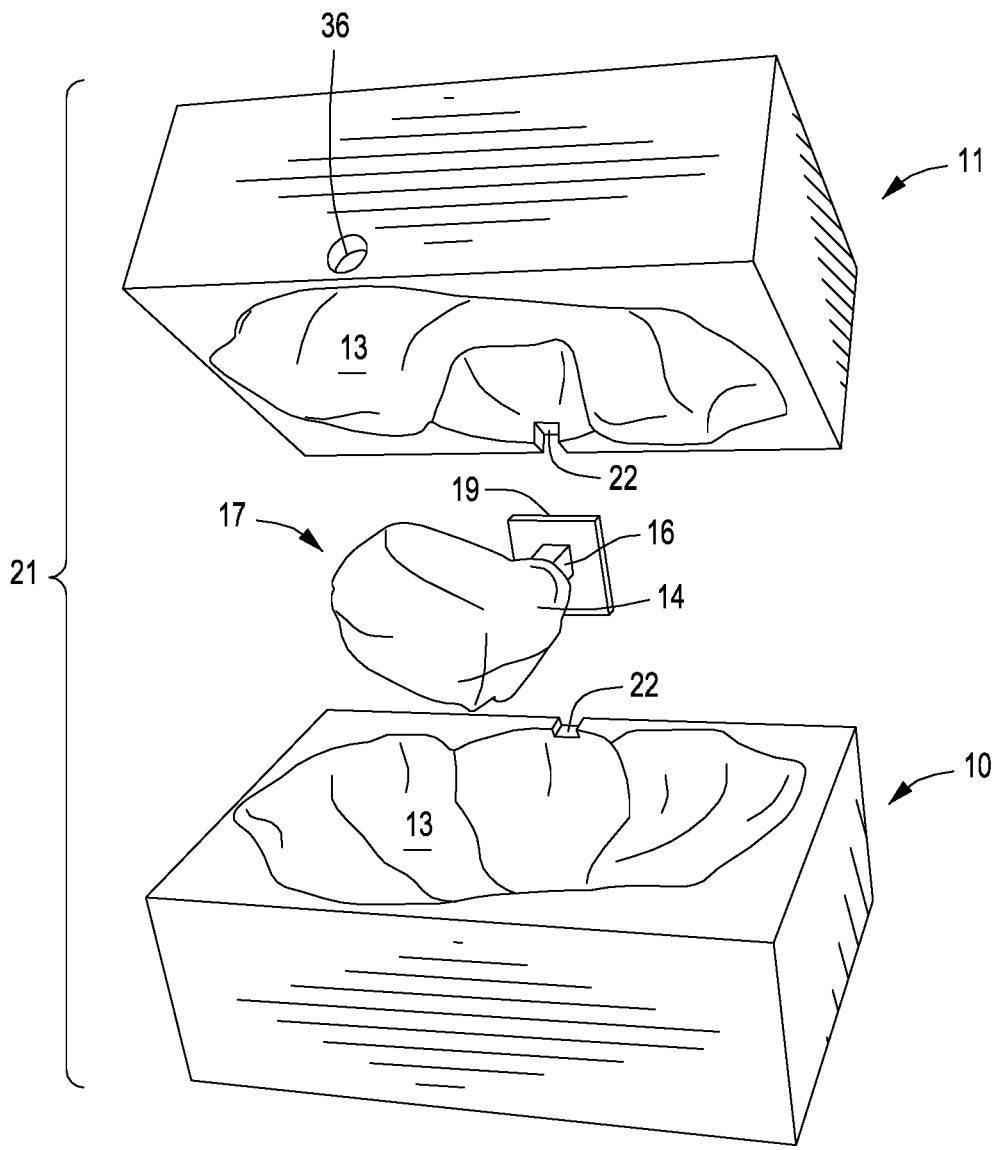
FIG. 4 is a perspective, exploded view of a molding system made up of the pieces illustrated in FIGS. 1-3, configured to produce the base model and insert as displayed in FIGS. 7-9 in one embodiment of the present disclosure.

Referring to FIG. 4, a depiction of the mold 21 and the insert 17 is shown with the top portion 11, the bottom portion 10, and the insert 17 oriented to be capable of fitting together. When the top portion 11, bottom portion 10, and the insert 17 are fit together, the void formed between the bottom and top portions 10, 11 and the insert 17 may correspond to the kidney structure excluding the tumor.

Figure 5:
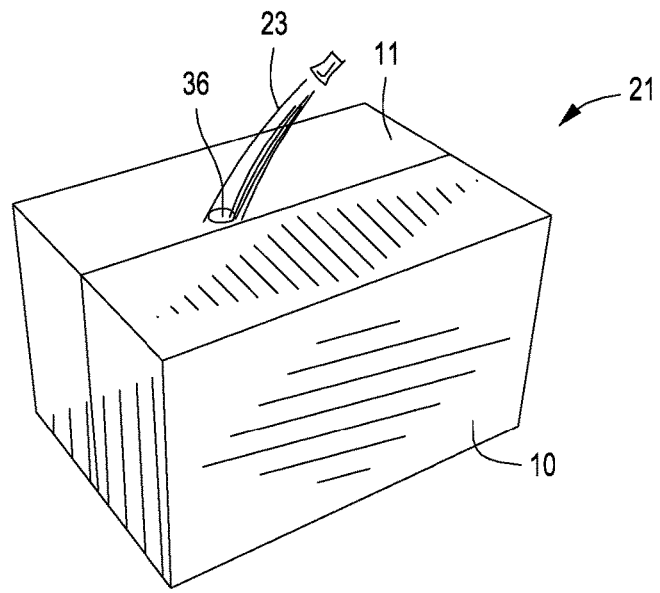
FIG. 5 is a perspective view of the molding system from FIG. 4 being filled with a suitable modeling material in one embodiment of the present disclosure.
Figure 6:
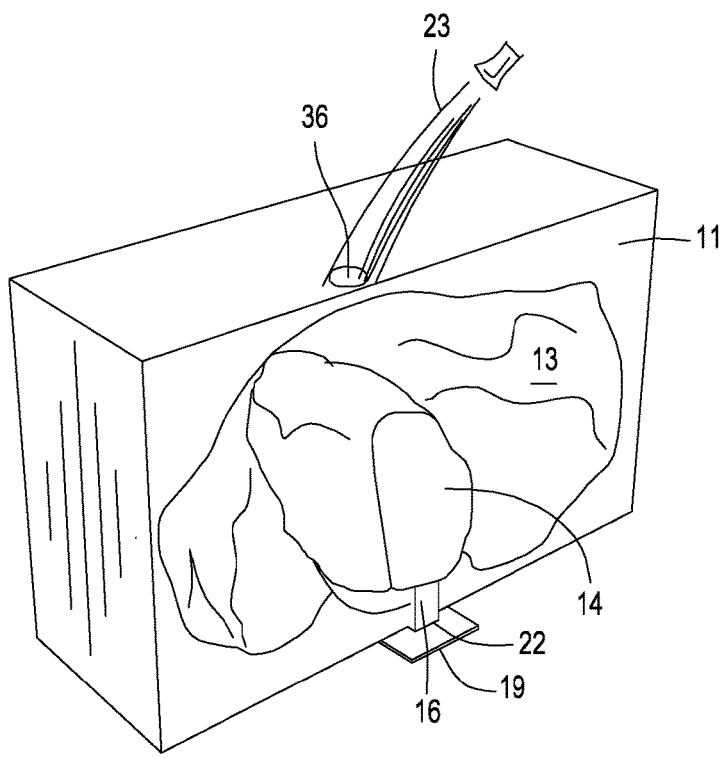
FIG. 6 illustrates, in a center cross section, a perspective view of the molding system from FIG. 4 being filled with a suitable modeling material in one embodiment of the present disclosure.

Referring to FIGS. 5 and 6, a depiction of the assembled mold 21 with the insert in place is shown as being filled with material 23. The material 23 may initially comprise a liquid, for example, a resin or silicone-based substance. The extension 19 of the insert may be positioned so as to ensure the insert shape 14 is correctly positioned at the desired location in the cavity 13. The weight of the top portion 11 and the bottom portion 10 of the mold 21 on the extension 19 of the insert may prevent unwanted movement of the insert while the material 23 is being added to the mold.

Figure 7:
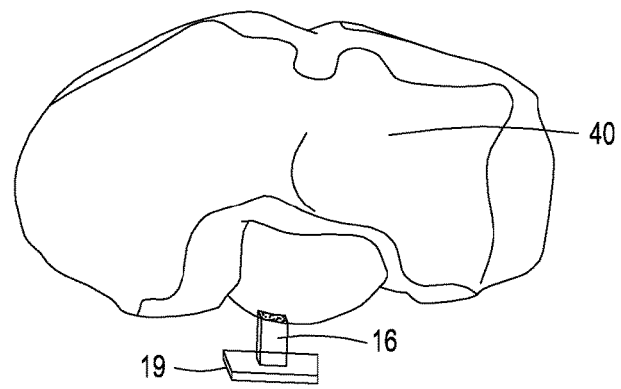
FIG. 7 is a perspective view of the base model and imbedded insert one embodiment of the present disclosure.
Figure 8:
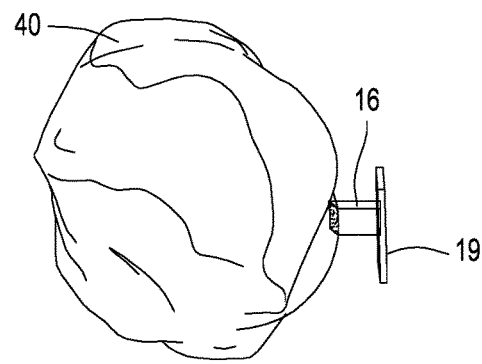
FIG. 8 is a perspective view of the base model and imbedded insert in one embodiment of the present disclosure.
Figure 9:
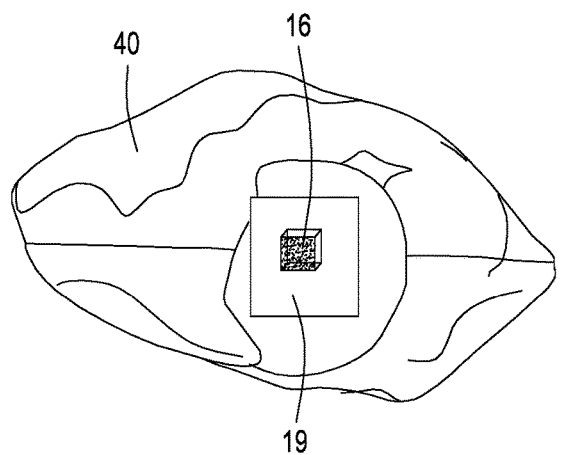
FIG. 9 is a perspective view of the base model and imbedded insert in one embodiment of the present disclosure.

Referring to FIGS. 7, 8, and 9, a depiction of a kidney base model 40 formed from the first material is shown with the elongated structure 16 and extension 19 of the insert protruding from the kidney base model 40. After the material has solidified within the mold, the top portion and the bottom portion of the mold are separated, and the kidney base model 40 is removed from the mold. The insert remains in the mold as depicted. Alternatively, the insert may be removed while the kidney base model 40 is still in the mold. Preferably, the insert is prevented from shifting within the kidney base model 40 as a result of the extension 19 and/or elongated structure 16 until the kidney base model 40 becomes fully solid, which subsequently locks the insert in place.

Figure 10:
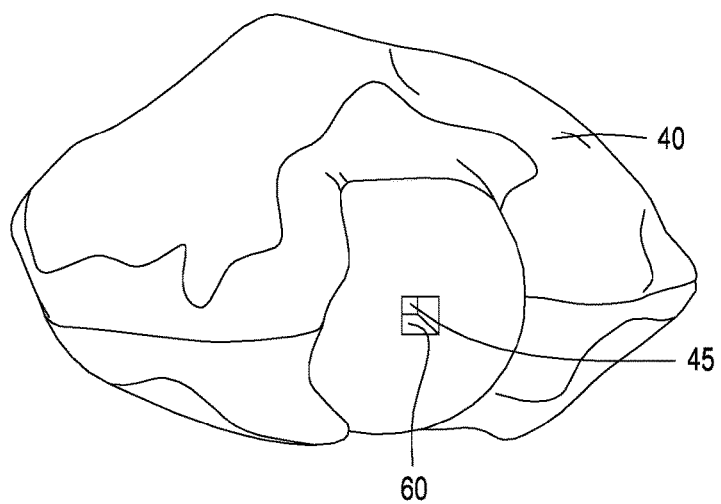
FIG. 10 is a perspective view of the base model after removal of the imbedded insert, leaving a cavity in the volume where a feature is desired in one embodiment of the present disclosure.
Figure 11:
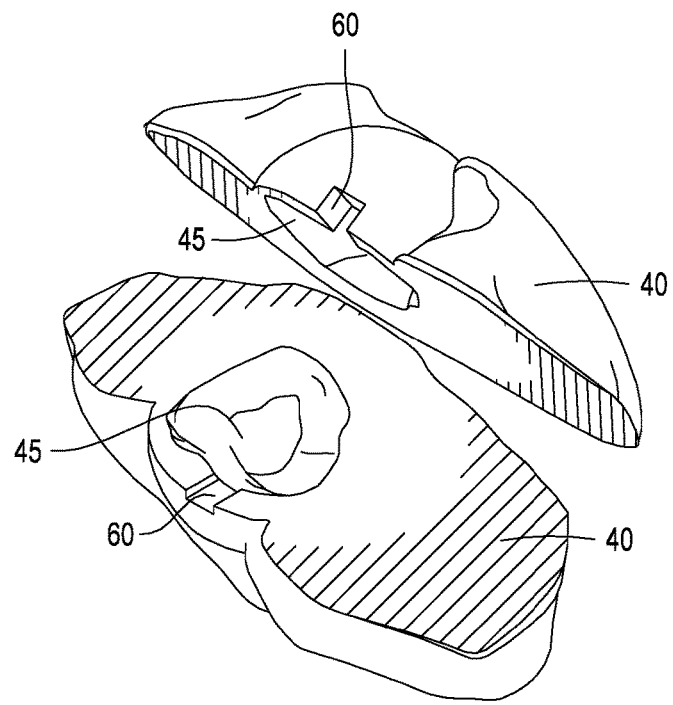
FIG. 11 illustrates in a perspective view what the base model, after removal of the imbedded insert, would look like if split in half in one embodiment of the present disclosure. The top and bottom pieces are in fact one solid, continuous piece but are shown separated to illustrate the internal cavity.

Referring to FIGS. 10 and 11, a depiction of the kidney base model 40 formed from the first material is shown after the insert has been removed. The insert may be removed by dissolving the insert in a fluid, then removing the liquefied insert material. For example, a kidney base model 40 with an insert comprising PVA embedded in it may be placed in water to dissolve the insert. Once dissolved, the kidney base model 40 with its newly formed cavity 45 can be removed from the PVA-in-water solution, and the solution poured from the cavity 45. Also, for example, a kidney base model 40 with an insert comprising one or more polymers or plastics may be placed in acetone or fluids with similar characteristics to dissolve the insert. For example, an insert having a melting point below that of the first material may be heated until liquefied and removed from the kidney base model 40. The kidney base model 40 with the insert inside may be placed in a volume of liquid which is heated and/or agitated as needed depending on the composition of the insert. The removal of the insert may result in a cavity 45 within the kidney base model 40. Although the kidney base model 40 is depicted as two halves in FIG. 11, preferably the kidney base model 40 is a single piece of silicone mixture. FIG. 11 is presented to demonstrate the shape of the cavity 45 remaining after removal of the insert. In addition to the cavity 45, there may also be a channel 60 produced by removal of the elongated structure of the insert. The channel 60 may extend from outside of the kidney base model 40 to the cavity 45 formed by removal of the insert. The channel 60 may or may not correspond to a tumor portion of the model, i.e., it may or may not have been added to the tumor-shaped model prior to formation of the insert.

Figure 12:
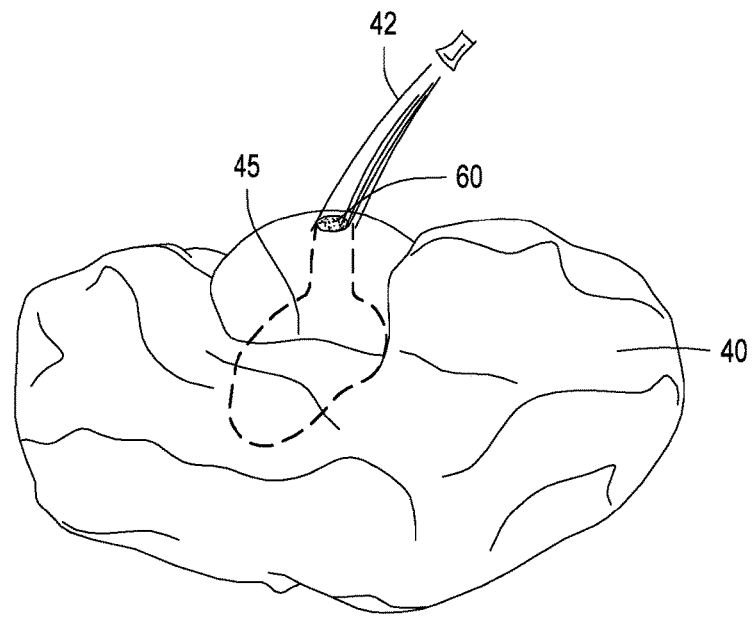
FIG. 12 is a perspective view of the base model while the internal cavity in the base model is being filled with a material suitable to model the desired feature in one embodiment of the present disclosure.
Figure 13:
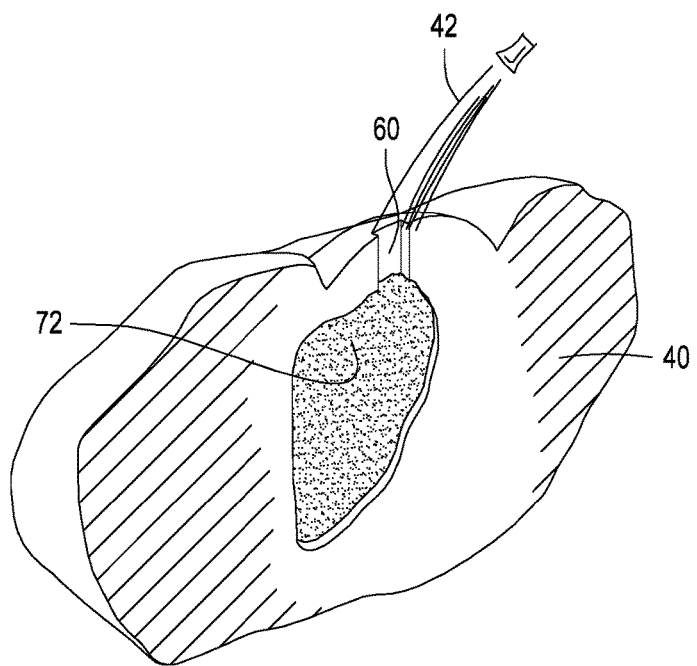
FIG. 13 is a center cross section perspective view of the base model where the internal cavity in the base model has been filled with a material suitable to model the desired feature and the channel connecting the internal cavity to the outside of the model is being filled with the same material as the base model in one embodiment of the present disclosure.

Referring to FIGS. 12 and 13, a second material 42 is being poured into the cavity 45 formed by removal of the insert. The tumor model 72 may be formed after removing the tumor-shaped insert by pouring a second material 42 into the cavity 45 remaining after removal of the insert. The channel 60 provides an entrance hole in the kidney base model 40 through which the second material 42 may be poured. When a tumor model 72 is completely internal to the kidney model 40 as is pictured in the figures, an elongated structure may be added to the insert to form a channel, for example as seen in FIG. 3. When a tumor model 72 is at least partially external from the kidney model, a channel through the kidney base model 40 may not be needed. In this case, the kidney base model 40 may still be contained in the mold, and the mold may correspond to portions of the exterior of the feature (e.g., tumor) after the insert is dissolved.

Figure 14:
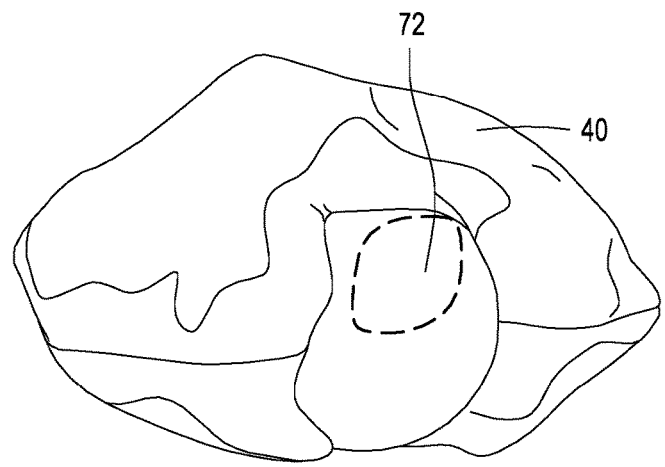
FIG. 14 is a perspective view of the final product in one embodiment of the present disclosure. The dashed lines indicate an internal feature.
Figure 15:
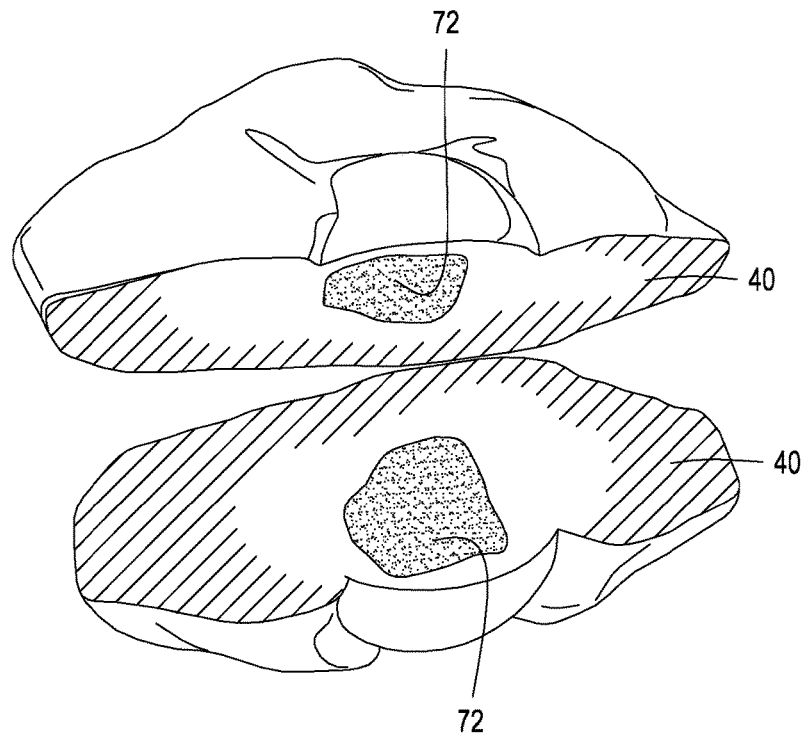
FIG. 15 illustrates in a perspective view what the final model, including internal feature, would look like if split in half in one embodiment of the present disclosure. The top and bottom images are in fact one solid, continuous piece but are shown separated to illustrate the internal cavity.

Referring to FIGS. 14 and 15, a final kidney-tumor model is depicted, wherein the tumor model 72 is entirely encased by the kidney model 40. After removing the insert and adding the second material, the second material may be permitted to solidify. Once solidified, the second material does not completely fill the channel because the tumor does not extend to the surface of the kidney. The first material may then be used to fill the remaining portion of the channel such that the first material completely encases the second material.

Figure 16:
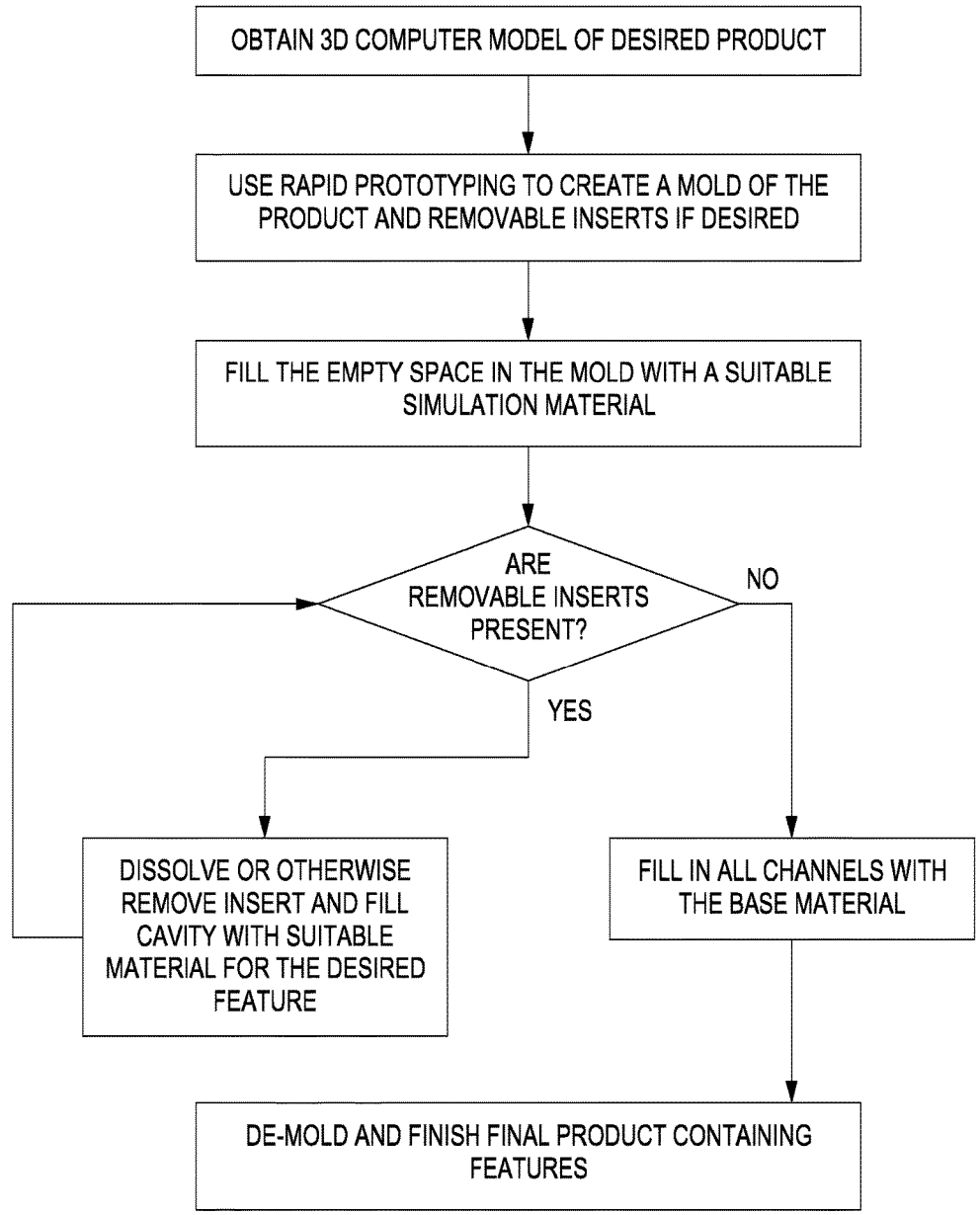
FIG. 16 is a flow diagram of the Anatomize Me process for creating anatomy models from a computer model, including features different from the base model.

Referring to FIG. 16, a block diagram of the steps of one specific embodiment of the methods claimed herein is depicted. The block diagram serves to illustrate the manner in which a mold having multiple removable inserts may be processed.

5. Additional Specific Embodiments

One or more specific embodiments, which may include aspects in common with the earlier reference specific embodiments, are now described. In certain specific embodiments, the goal of this process is to create lifelike models of anatomy and implants (referred to herein as the "Anatomize Me" process) which can rapidly be custom built to desired specifications. The Applicant's process allows for rapidly produced models that look and feel real. In embodiments these physical models are based on a patient's actual anatomy, and in other embodiments are designed as desired.

A model creation process embodying the present invention utilizes, as an input to the process, a 3D computer model. The Anatomize Me process creates a physical model from this computer model. In at least one embodiment, this computer model contains one or more volumes with different physical properties or coloration from the base model (hereafter to be referred to as features). In at least one embodiment, the computer model is based on medical scan data from an individual patient and is used to practice that patient's surgery.

In one embodiment, the input 3D computer model comprises a kidney and a tumor inside the kidney, modeled based on a patient's Magnetic Resonance Imaging (MM) or Computed Tomography (CT) data. In this embodiment the Anatomize Me process produces a physical model of the patient's kidney with an imbedded tumor which can be used to practice excising the patient's tumor in robotic assisted surgery. The Anatomize Me process for this embodiment is illustrated in FIG. 1-15.

In a different embodiment, the input 3D computer model consists of a computer model of a patient's foot, and the Anatomize Me process produces a physical 3D model of the patient's foot containing a hard internal structure mimicking the patient's bone, a soft volume around the bone modeling the patient's muscle and connective tissue, and an internal volume modeling the patient's vasculature inside the foot.

In a different embodiment, the Anatomize Me process is used to create a life-like model of a heart, including empty spaces inside the vasculature where appropriate.

In a different embodiment, the present invention is used to create a model of a human spinal column, including bone, nerves, and discs for use in the training of medical professionals.

In a different embodiment, the present invention is used to create a model ear in one solid piece which may be used by the patient for cosmetic reasons in the case of a lost ear.

The Anatomize Me process is conducted as follows. Using Computer Aided Design (CAD) software, a 3D computer model of the desired anatomy is used to create a 3D computer model of a mold of the desired anatomy. In one embodiment, this is achieved by importing the input data into a CAD program, combining all parts of the model, and then subtracting the result from a solid block. This mold may be split into two or more pieces to eventually allow for easier de-molding and re-use of the mold. A channel is added to one or more pieces of the computer model of the mold to allow for the interior to be filled. Features, if desired, are designed as separate pieces containing channels that run to the outside of the mold and that fit together with the mold (hereafter referred to as inserts).

Once the computer 3D model is complete, rapid prototyping techniques are used to create the mold and inserts. In at least one embodiment, 3D printing is used to create the mold and any inserts. In other embodiments, laser cutting, other rapid prototyping techniques, or a combination of rapid prototyping techniques are used to create the mold and inserts. In different embodiments, the base model may be created out of many possible materials, including (but not limited to) Polylactic Acid (PLA), Acrylonitrile butadiene styrene (ABS), other plastics, resins, and metals. Two types of inserts may be used. Removable inserts are manufactured out of a material that is dissolvable or otherwise removable from the base model, including but not limited to ABS, Polyvinyl alcohol (PVA) and High Impact Poly-Styrene (HIPS). Non-removable inserts may be made out of any of the materials listed as possible base materials.

After their construction, the mold and inserts are fitted together. The mold is then filled with a suitable material for creating the desired characteristics of the base model. Materials that could be used for the base model include but are not limited to silicone gels, hydrogels, plastics, rubbers, silicone rubbers, elastomers and composite materials. After setting, the mold is removed, leaving the base model with any inserts imbedded in or touching the base model.

Next, one or more removable insert (if any are included in the design) are removed using a suitable technique. In one embodiment, ABS removable inserts are dissolved in acetone. In another embodiment, removable PVA inserts are dissolved in boiling water. In a third embodiment, removable HIPS is dissolved in limonene. In a fourth embodiment, removable inserts are melted away under high heat. In additional embodiments, other removable inserts are removed from the base model as appropriate.

After complete removal of one or more removable inserts, what remains is the base model connected to any non-removable inserts and any removable inserts that have not yet been removed. When fit together with the mold at this step, any volume(s) where feature(s) originally modeled by the removable inserts that have now been removed will be empty. In one or more embodiments this base model will contain invaginations in the space where internal features originally modeled by removable inserts are desired.

Each space is then filled with a material suitable for modeling the feature up to the channel originally connecting it to the mold. In at least one embodiment, at least one feature is created out of a different density or color of the same material used in the base model. In other embodiments, one or more features are made out of different materials than that used in the base model including silicone gels, hydrogels, plastics, rubbers, silicone rubbers, elastomers and composite materials. If any removable inserts are still present, they are sequentially removed and filled as detailed in the last 3 paragraphs. Once all removable inserts have been removed, each empty channel is filled with the material originally used for the base model.

The resulting model, after finishing and clean up, contains an accurate physical model created from a 3D computer model, which in embodiments includes features with different physical properties and made from different materials than the base model.

This embodiment consists of the creation of a model of a tumor inside a kidney for use in practicing kidney tumor excision surgery. The input data consists of a computer model of a patient's kidney and a tumor internal to the patient's kidney, which was derived from a MRI of the patient processed using 3D Slicer©1.

The computer kidney and tumor models are combined, then subtracted from a large rectangular block in Tinkercad© (Autodesk, inc. San Rafael, Calif.). Referring now to FIGS. 1-4, a channel 36 is added connecting the internal cavity to the surface of the mold. The computer internal tumor insert piece 14 is placed inside the mold in its correct position according to the input data. The tumor insert piece is connected to the outside of the mold using channel 16, and the space where this channel passes through the mold is subtracted from the mold creating the entrance 22. The mold is then split in two, resulting in two mold pieces, 10 and 11, and one insert piece consisting of 14 and 16.

The first mold piece, 10, contains part of the channel 22 that locks the insert in place and will later be used to fill the space left by the removable insert once it is removed. The second mold piece 11 also contains part of the channel 22 as well as the entirety of channel 36 which will be used to fill the mold with the base material. These two mold pieces and the insert fit together as displayed in FIG. 4. The insert and mold computer model pieces are converted into STereo-Lithography (.stl) format and sliced using CURA to prepare for their manufacture by 3D printing.

The mold pieces 11 and 12 are then physically created using an Ultimaker 2© (Ultimaker. Geldermalsen, Netherlands) 3D printer. These pieces are 3D printed using the plastic PLA using manufacturer's instructions. Specifically, the PLA mold pieces were printed at a nozzle temperature of 220 degrees Celsius with a base plate temperature of 75 degrees Celsius, 100% fan and using filament with a 2.85 mm diameter. The insert, comprised of 14 and 16, is printed separately in PVA at 190 degrees Celsius with a base plate temperature of 75 degrees Celsius, and 0% fan using filament with a 3 mm diameter.

Now referring to FIG. 5-6, the physical mold pieces made from PLA, 10 and 11, and the physical insert made from PVA, comprised of 14 and 16, are fitted together such that the channel of the insert 16 is placed inside the groove 22 creating a tight fit that positions the insert correctly inside the mold, matching the position of the patient's tumor in the input data. Next, the mold held together using clamps, tape, and rubber bands and/or adhesives as appropriate and then filled with a mixture simulating the kidney. The simulated kidney material used in this embodiment is as follows:

A) 70% by volume Smooth-On platinum-cured silicone with a shore hardness of 10 (Dragon Skin® 10 A Fast, Smooth-On, Inc., Easton, Pa.).

B) 30% by volume Smooth-On Silicone Thinner (Silicone Thinner, Smooth-On, Inc., Easton, Pa.).

C) Addition of red and blue food dye until an appropriate color is achieved.

The mold is filled up to the bottom of the hole in the mold 36. After 90 minutes, giving the base model material time to harden, the base model is delicately removed from the mold pieces 11 and 12, which can be discarded or set aside for future use. Referring now to FIG. 7-9, the base material is formed into a model of the patient's kidney, 40, containing a PVA insert 16 at the location where the patient's tumor was observed in the original input data.

The insert inside the kidney model 40 is then removed by boiling in water with heavy stirring for 2 hours, with frequent replacement of the water for maximum efficiency. This process dissolves away the insert 40, creating a cavity 45 and a channel leading to the cavity 60 which exist as empty space within the kidney model 40 as illustrated in FIG. 10-11.

Referring now to FIG. 12, the cavity 45 inside the kidney model is filled with a material simulating the patients tumor, created in this embodiment as follows:

A) 70% by volume Smooth-On platinum-cured silicone with a shore hardness of 10 (Dragon Skin® 10 A Fast, Smooth-On, Inc., Easton, Pa.).

B) 30% by volume Smooth-On Silicone Thinner (Silicone Thinner, Smooth-On, Inc., Easton, Pa.).

C) Addition of yellow and green food dye to achieve the desired color

D) Heavy stirring of all components for 7 minutes after initially mixed to introduce small air bubbles in the mixture.

As illustrated in FIG. 12, this mixture is added into the cavity 45, filling it to create the tumor model 72. At this stage the channel 60 unfilled. Finally, as illustrated in FIG. 13, the channel 60 is filled with the same material used to simulate the kidney. This results in solid, lifelike, cut-able kidney model 40 with an internal tumor model 72 that can only be accessed by cutting open the kidney. The resulting model has been used for simulated surgery applications, and is intended to constitute an anatomically accurate model of the patient's kidney and tumor to be used to practice removal of the patient's tumor prior to the patient's actual surgery.

The foregoing details the features of an embodiment of the invention so that those skilled in the art may better understand the aspects of the present disclosure. Those skilled in the art should appreciate that they may readily use the present disclosure as a basis for other devices and models that simulate natural biological tissue, including human tissue. In particular, the materials and methods of the present disclosure may be readily used in any application where the simulation of human anatomy or organs, with or without additional features, is desired. Such applications include, but are not limited to, medical training devices, educational anatomy models, manikins, sex toys, puppets, costumes and/or other devices. Those skilled in the art should also realize that such equivalent constructions do not depart from the spirit and scope of the present disclosure, and that they may make various changes, substitutions, and alterations to the embodiments disclosed herein without departing from the spirit and scope of the present disclosure. Also, it will be fully appreciated that the above-disclosed features and functions, and variations thereof, may be combined into other methods, systems, apparatus, or applications.

What is claimed as the invention is:

1. A method for producing an anatomical model, comprising:
   providing a first portion of a mold having a first portion of a first cavity and a second portion of a mold having a second portion of the first cavity, wherein the first cavity, or the first portion of the first cavity, or the second portion of the first cavity, is shaped to correspond to an anatomical structure, wherein: the first portion of the mold and the second portion of the mold each has an inner surface and an outer surface; and the first portion of the mold, or the second portion of the mold, or both the first and second portions of the mold comprises a channel extending from the inner surface to the outer surface of the first portion of the mold, or of the second portion of the mold, or of both the first and second portions of the mold; and an opening extending from the inner surface to the outer surface of the first portion of the mold, or of the second portion of the mold, or of both the first and second portions of the mold;
   positioning an insert comprising a protrusion so that a portion of the insert is disposed inside the first portion of the first cavity of the mold, or inside the second portion of the first cavity of the mold, or inside both the first and second portions of the first cavity of the mold, and wherein the protrusion is disposed in the channel;
   bringing together the first portion of the mold with the second portion of the mold to form the first cavity wherein at least a portion of the insert is disposed within the first cavity;
   introducing a first material through the opening of the mold into the first cavity to form a base model, which opening extends from the inner surface to the outer surface of the first portion of the mold, or of the second portion of the mold, or of both the first and second portions of the mold;
   removing at least one portion of the insert from the mold to form a second cavity inside the mold wherein removing at least a portion of the insert from the mold comprises dissolving or melting the portion of the insert while the first material remains solidified; and
   introducing a second material through the channel into at least a portion of the second cavity;
   wherein the mold, the insert, or both the mold and the insert are produced by layering.

2. The method of claim 1 wherein the insert comprises a first insert portion and a second insert portion.

3. The method of claim 2 wherein removing at least a portion of the insert from the mold comprises removing the first insert portion.

4. The method of claim 1 further comprising:
   removing another insert portion from the mold to form a third cavity inside the mold; and
   positioning a third material into at least a portion of the third cavity.

5. The method of claim 1 wherein the insert corresponds to one or more features of the anatomical structure.

6. The method of claim 1 further comprising positioning the first material into the second cavity such that the first material at least partially surrounds the second material.

7. The method of claim 1 wherein positioning the first material into the first cavity such that the first material forms the base model comprises placing the first material in liquid form into the first cavity and permitting the first material to solidify.

8. The method of claim 1 wherein the anatomical structure comprises a pathological structure.

9. The method of claim 1 wherein the protrusion extends from the inner surface of the mold to the outer surface of the mold.

10. The method of claim 1 wherein the elongated structure is non-cylindrical.

11. A method for producing an anatomical model, comprising:
    providing a mold having a first cavity shaped to correspond to an anatomical structure, wherein the mold has an inner surface adjacent the first cavity and an outer surface and comprises at least one elongated channel that is non-cylindrical section extending from the inner surface of the mold to the outer surface of the mold and an opening extending from the inner surface to the outer surface of the mold;
    providing an insert inside the first cavity of the mold wherein the insert includes an elongated structure that is non-cylindrical and corresponds at least partially to the cross-section of the elongated channel, fits into the elongated channel, and extends at least from the inner surface of the mold to the outer surface of the mold;

positioning a first material through the opening of the mold into the first cavity to form a base model;

liquefying at least one portion of the insert to form a liquid portion;

removing the liquid portion to form a second cavity inside the mold; and positioning a second material through the groove of the mold into at least a portion of the second cavity.

12. The method of claim 11 wherein providing a mold comprises producing the mold using a three-dimensional printer from a computer mold model.

13. The method of claim 11 wherein providing an insert inside the first cavity of the mold comprises producing the insert using a three-dimensional printer and positioning the insert inside the first cavity of the mold.

14. The method of claim 11 wherein the first material, the second material, or both the first and second materials have a shore hardness from 0 to 30 on the shore A scale after solidifying.

15. The method of claim 11 wherein the insert comprises polyvinyl alcohol.

16. The method of claim 11 wherein the mold comprises a first section and a second section, and the first section and the second section are capable of being removably coupled to one another.

17. The method of claim 11 wherein the elongated structure is a protrusion and the elongated channel is a groove.

18. The method of claim 11 wherein the first material comprises silicone rubber.

19. The method of claim 11 wherein the anatomical structure corresponds to imaging data from an MRI or CAT scan.

* * * * *